US012670004B2

(12) United States Patent
Tsirkin et al.

(10) Patent No.: US 12,670,004 B2
(45) Date of Patent: *Jun. 30, 2026

(54) FAIL-SAFE POST COPY MIGRATION OF CONTAINERIZED APPLICATIONS

(71) Applicant: Red Hat, Inc., Raleigh, NC (US)

(72) Inventors: Michael Tsirkin, Yokneam Illit (IL); Andrea Arcangeli, Mineola, NY (US)

(73) Assignee: Red Hat, LLC, Raleigh, NC (US)

( * ) Notice: Subject to any disclaimer, the term of this patent is extended or adjusted under 35 U.S.C. 154(b) by 577 days.

This patent is subject to a terminal disclaimer.

(21) Appl. No.: 17/967,322

(22) Filed: Oct. 17, 2022

(65) Prior Publication Data

US 2023/0043180 A1 Feb. 9, 2023

Related U.S. Application Data

(63) Continuation-in-part of application No. 16/662,521, filed on Oct. 24, 2019, now Pat. No. 11,474,848.

(51) Int. Cl.
G06F 9/455 (2018.01)
G06F 3/06 (2006.01)

(52) U.S. Cl.
CPC ........ G06F 9/45558 (2013.01); G06F 3/0608 (2013.01); G06F 3/0631 (2013.01); G06F 3/0673 (2013.01); *G06F 2009/4557* (2013.01); *G06F 2009/45583* (2013.01)

(58) Field of Classification Search
CPC .............. G06F 9/45558; G06F 9/5016; G06F 12/0646; G06F 2212/152; G06F 2009/45583; G06F 2009/45575; G06F 2009/4557

See application file for complete search history.

(56) References Cited

U.S. PATENT DOCUMENTS

| | | | |
|---|---|---|---|
| 8,489,699 B2 | 7/2013 | Goggin et al. | |
| 8,661,211 B2 | 2/2014 | Dow | |
| 8,930,947 B1 | 1/2015 | Derbeko et al. | |
| 9,740,647 B1 * | 8/2017 | Arroyo | G06F 13/28 |
| 10,282,225 B2 | 5/2019 | Vincent | |

(Continued)

OTHER PUBLICATIONS

Hines, M.R. et al. "Post-Copy Live Migration of Virtual Machines" Computer Science, Binghamton University (SUNY), 13 pages.

(Continued)

*Primary Examiner* — Dong U Kim
(74) *Attorney, Agent, or Firm* — Dority & Manning, P.A.

(57) ABSTRACT

A supervisor on a destination host receives a request to migrate an application from a source host to the destination host and determines a total amount of memory associated with the application on the source host. The supervisor on the destination host allocates one or more memory pages in a page table on the destination host to satisfy the total amount of memory associated with the application on the source host, where the one or more memory pages are to be associated with the application on the destination host. Responsive to determining that the one or more memory pages have been allocated on the destination host, the supervisor on the destination host initiates migration of the application from the source host to the destination host.

20 Claims, 5 Drawing Sheets

(56) References Cited

U.S. PATENT DOCUMENTS

| | | | | |
|---|---|---|---|---|
| 2012/0102190 A1* | 4/2012 | Durham | ............. | G06F 9/45558 718/1 |
| 2013/0205113 A1* | 8/2013 | Ahmad | ................ | G06F 12/023 711/170 |
| 2013/0238804 A1* | 9/2013 | Tanino | ............... | G06F 9/45558 709/226 |
| 2013/0326175 A1* | 12/2013 | Tsirkin | ............... | G06F 9/45558 711/E12.103 |
| 2014/0019974 A1* | 1/2014 | Siu | ........................ | G06F 9/4856 718/1 |
| 2014/0359613 A1* | 12/2014 | Tsirkin | ................. | G06F 9/5088 718/1 |
| 2014/0365816 A1* | 12/2014 | Antony | .............. | G06F 11/2033 714/6.11 |
| 2015/0058486 A1* | 2/2015 | Huang | .................... | H04L 47/70 709/226 |
| 2016/0026489 A1* | 1/2016 | Maislos | ............. | G06F 9/45558 718/1 |
| 2016/0139962 A1* | 5/2016 | Tsirkin | ................ | G06F 9/45558 718/1 |
| 2016/0239323 A1* | 8/2016 | Tsirkin | ................ | G06F 9/45558 |
| 2017/0090964 A1 | 3/2017 | Tsirkin | | |
| 2017/0090968 A1* | 3/2017 | Tsirkin | ................. | G06F 13/404 |
| 2017/0139637 A1* | 5/2017 | Roozbeh | ................ | G06F 3/067 |
| 2017/0147501 A1* | 5/2017 | Tsirkin | ................. | G06F 12/109 |
| 2017/0344298 A1* | 11/2017 | Shih | ........................ | G06F 12/12 |
| 2017/0364263 A1* | 12/2017 | Lublin | ................... | G06F 12/02 |
| 2018/0046489 A1* | 2/2018 | Onoue | ................. | G06F 9/5083 |
| 2018/0232254 A1* | 8/2018 | Mohan | ................. | G06F 3/0632 |
| 2019/0278624 A1* | 9/2019 | Bade | .................... | G06F 9/4868 |
| 2019/0391835 A1* | 12/2019 | Gowda | ............. | G06F 9/45558 |
| 2019/0391843 A1* | 12/2019 | Franciosi | ........... | G06F 12/1072 |

OTHER PUBLICATIONS

Clark, C. et al. (2005) "Live Migration of Virtual Machines", University of Cambridge Computer Laboratory; Department of Computer Science University of Copenhagen, Denmark. 14 pages.

* cited by examiner

100

FAIL-SAFE POST COPY MIGRATION OF CONTAINERIZED APPLICATIONS

RELATED APPLICATIONS

The present application is a continuation-in-part of application Ser. No. 16/662,521, filed Oct. 24, 2019, entitled "Fail-Safe Post Copy Migration of Virtual Machines," which is incorporated by reference herein in its entirety.

TECHNICAL FIELD

The present disclosure is generally related to computer systems, and more particularly, to migration of containerized applications in virtualized computer systems.

BACKGROUND

Virtualization is a computing technique that improves system utilization, decoupling applications from the underlying hardware, and enhancing workload mobility and protection. Virtualization may be realized through the implementation of virtual machines (VMs) and containerized applications. A VM is a portion of software that, when executed on appropriate hardware, creates an environment allowing the virtualization of an actual physical computer system (e.g., a server, a mainframe computer, etc.). The term "container," as known in the art, refers to (1) an executable software package that bundles the executable code for one or more applications together with the related configuration files, libraries, and dependencies, and (2) isolated execution environment for running the executable code retrieved from the executable software package. The isolated execution environment may be provided by an isolated instance of the user space (i.e., unprivileged execution environment), while possibly sharing the kernel space (i.e., privileged execution environment in which at least part of the operation system kernel runs) with other execution environments (e.g., other containers).

The physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system." Similarly, containers with their respective applications (i.e., containerized applications) can be managed by a supervisor. A supervisor can refer to a software module that manages one or multiple applications running with a single execution environment (e.g., container). The host machine can be a physical machine or a virtual machine.

In multiple host environments, a running application or group of applications can be moved from one host machine to another without disconnecting or terminating the application. Memory, storage, and network connectivity of the application(s) can be transferred from a source host computing platform ("the source host") to a destination host computing platform ("the destination host") connected over a network. This process is referred to as "live migration". Migration can also refer to an application restore (e.g., where the application is restored on a destination host).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
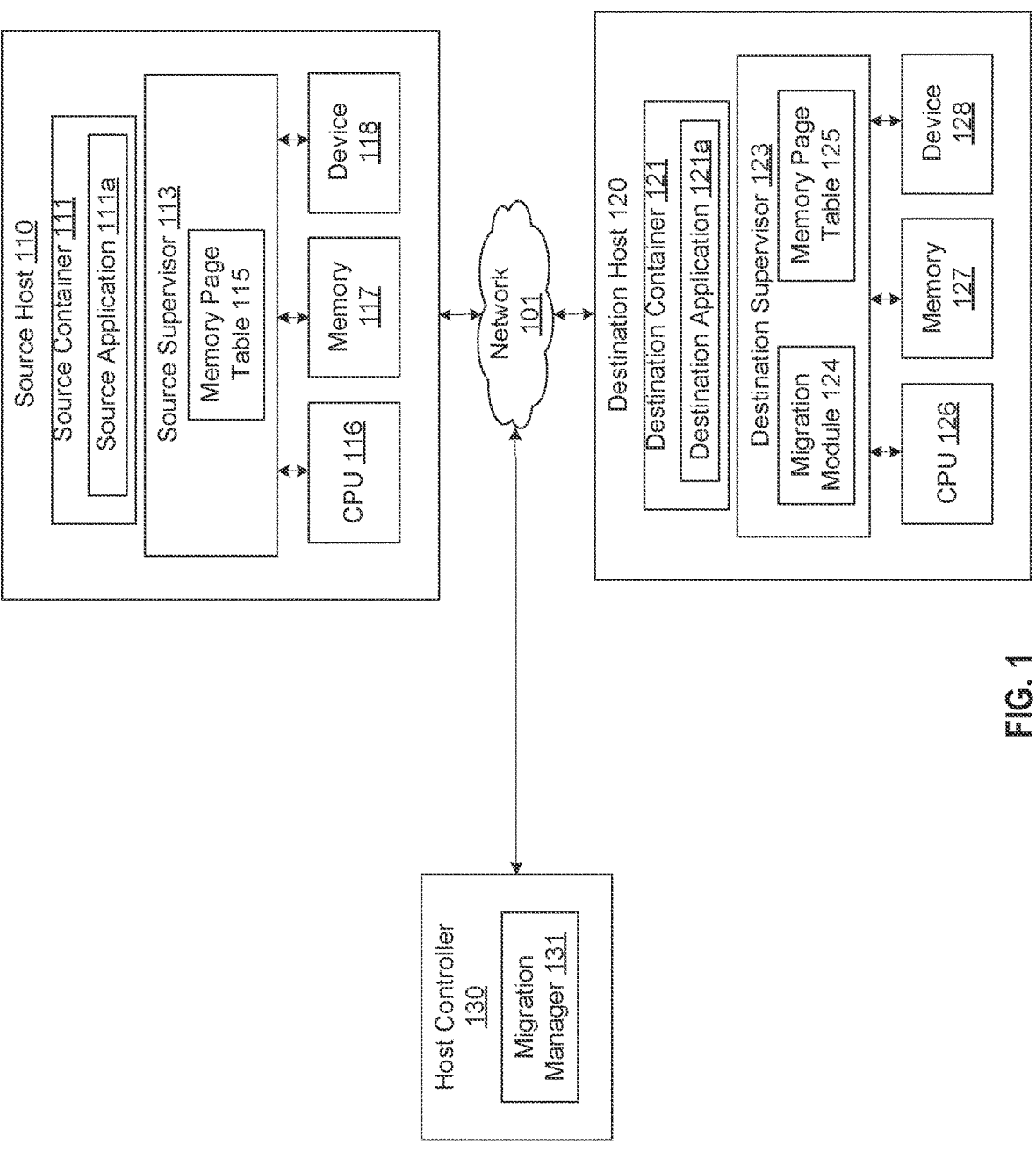
FIG. 1 depicts a high-level component diagram of an example computer system architecture, in accordance with one or more aspects of the present disclosure.

Described herein are methods and systems for fail-safe post copy migration of containerized applications.

A containerized application may be an application running in a container in a virtual system environment. A processor may support executing a supervisor that acts as a host and has full control of the processor and other platform hardware. A supervisor can be a software module that can monitor and control multiple processes and applications running in containers on a host system. A supervisor is a tool that is able to retain selective control of processor resources, physical memory, interrupt management, and input/output (I/O). Each container is an executable software package that bundles the executable code for one or more applications together with the related configuration files, libraries, and dependencies, and is an isolated execution environment for running the executable code retrieved from the executable software package. The isolated execution environment may be provided by an isolated instance of the user space (i.e., unprivileged execution environment), while sharing the kernel space (i.e., privileged execution environment in which at least part of the operation system kernel runs) with other execution environments (e.g., other containers). Each container can operate independently of other containers and uses the same interface to the processors, memory, storage, graphics, and I/O provided by a physical platform. The software executing in a container can be executed at the reduced privilege level so that the supervisor can retain control of platform resources. When a containerized application needs to perform a privileged operation (e.g., perform an I/O operation), the containerized application may do so by sending a system call to the supervisor, requesting that the supervisor perform the privileged operation on behalf of the containerized application.

Live migration typically permits a running application to be moved between different machines transparently for application programs running on the application and for their respective clients. For successful live migration, application memory and network connectivity should be migrated from the source host to the destination host. Methods of group migration may include "pre-copy" and "post-copy" techniques. Pre-copy techniques can involve sending a copy of the state of an application to the destination host while the application continues to execute on the source host. If some memory pages change during the process, they can be re-copied until there are very few changes remaining on the source, at which point the application can be stopped on the source and restarted on the destination. Post-copy techniques can involve suspending the application on the source, copying a subset of the state of the application to the destination, and then resuming the application on the destination. If a post-copied application attempts to access a page of its own memory that has not been migrated, the attempted access can generate a fault and the requesting application can stop executing until the memory is retrieved from the source host.

Employing post-copy techniques can provide many advantages over pre-copy techniques for live migration. In particular, pre-copy live migration of applications that utilize a large amount of memory can be very time consuming since the application may continue modifying memory on the source host which then needs to be copied to the destination host prior to starting the application on the destination host. With post-copy live migration, the application may be started on the destination host despite some of the memory associated with the application still residing on the source host.

Post-copy live migration, however, can present challenges to completing live migration successfully. Post-copy live migration of an application that utilizes a large amount of memory can often fail to complete successfully in instances where the destination host has insufficient resources to support the transfer of all of the memory used by the migrating application. In some instances, a destination host may indicate that there are adequate resources when migration is initiated, but during the migration process destination host resources may be utilized by other processes, thereby reducing resources available to the migrating application. In such cases, the lack of available resources to complete the migration can cause the migrating application to fail on the destination host.

Additionally, post-copy live migration techniques can negatively impact virtualized environments implementing device direct-mapping of physical devices. Device direct-mapping is a process where physical devices, such as network devices or video cards, can be made available (e.g., mapped) to applications by a supervisor. The supervisor can create a virtual device within the application that is associated with the physical device so that any access of the virtual device can be forwarded to the physical device by the supervisor with little or no modification. In such implementations, the physical device typically has access to all memory of the application. In conventional post-copy implementations, post-copy live migration of an application allows that application to begin execution on a destination host prior to all if its associated memory being relocated to that destination. Since some of that application's memory may still reside on the source host, directly mapping a device for that application cannot be implemented when the application is initiated on the destination host.

Some virtualized computing environments manage these issues by significantly restricting live migration capabilities. In some instances, where large applications are involved, migration can often involve shutting the application down completely prior to migration to ensure that any resource constraints that may arise on a destination host do not cause the application to fail while migration is in progress. This, however, can result in reducing system performance since the migration of executing applications is significantly restricted. Additionally, in some systems implementing device direct-mapping, live migration may be restricted to pre-copy techniques, which can significantly increase migration time. Moreover, in some instances, device direct-mapping may be deferred completely for a migrating application on the destination host, thereby significantly reducing any performance benefits to the application once migrated.

Aspects of the present disclosure address the above noted and other deficiencies by implementing a migration module (e.g., as a computer program or a computer program component) to facilitate fail-safe post copy migration of applications in a virtualized computing environment. The migration module, upon receiving a request to migrate an executing application from a source host to a destination host, can determine the total amount of memory used by the application on the source host and assess the resources available on the destination host. If there is a sufficient amount of available memory on the destination host to satisfy the total memory used by the application on the source, the migration module can pre-allocate memory on the destination host to support successful migration of the application's memory from the source to the destination. If, however, at the time the migration request is received the destination host does not have sufficient resources to support the migration, the request is rejected and the application remains on the source host.

Aspects of the present disclosure present advantages over certain solutions to the issues noted above. First, the migration module of the present disclosure provides the ability to assess the resource needs of a migrating application and reserve the needed resources on the destination host prior to initiating live migration. This can significantly improve the efficiency of post-copy live migrations, particularly with respect to applications that use large amounts of memory, reducing the likelihood of application failure after migration has been initiated. Thus, the negative consequences of a failed migration, such as an application that abnormally terminates after migration has been started, can be dramatically reduced. Additionally, in systems that implement device direct-mapping, the pre-allocation of memory for the migrating application can prevent out of memory conditions on the destination host that may prevent the use of device direct-mapping entirely.

FIG. 1 is a block diagram of a network architecture 100 in which implementations of the disclosure may operate. Although implementations of the disclosure are described in accordance with a certain type of system, this should not be considered as limiting the scope or usefulness of the features of the disclosure.

As shown in FIG. 1, the network architecture 100 includes one or more source hosts 110 coupled to one or more destination hosts 120 over a network 101. The network 101 may be a private network (e.g., a local area network (LAN), wide area network (WAN), intranet, etc.) or a public network (e.g., the Internet). The source hosts 110 and destination hosts 120 may also be coupled to a host controller 130 (via the same or a different network or directly). Host controller 130 may be an independent machine such as a server computer, a desktop computer, etc. Alternatively, the host controller 130 may be part of the source host 110 or destination host 120.

Host controller 130 can manage the source applications 111*a* and destination applications 121*a*. Host controller 130 may manage the allocation of resources from source host 110 to source applications 111*a*, the allocation of resources from destination host 120 to destination applications 121*a*. In addition, host controller 130 may initiate the migration of source application 111*a* with its associated memory to destination application 121*a* of destination host 120. In some implementations, host controller 130 may run on a separate physical machine from source host 110 and destination host 120. Alternatively, host controller 130 may run locally on either source host 110 or destination host 120. The host controller 130 may include a migration manager 131 to initiate the migration of source application 111*a* to destination application 121*a*.

Source host 110 may include server computers or any other computing devices capable of running one or more source containerized applications 111*a*. Each source application 111*a* can be within a respective source container 111. Each source application 111*a* can be a software implementation of a containerized application capable of being executed on various physical machines and environments. Each source application 111*a* may run a guest operating system (OS) that may be different from one virtual machine to another. The guest OS may include Microsoft Windows, Linux, Solaris, Mac OS, etc. In some implementations, the guest OS can itself be a containerized application.

The source host 110 may additionally include a source supervisor 113, which provides a virtual operating platform for source applications 11*aa* and manages their execution. Source supervisor 113 can manage the source-side tasks required for migration of a source application 111*a* that is running on source host 110 to a destination host 120. The source supervisor 113 can monitor the status of the migration state of each source application 111*a* during migration, migrate memory pages from memory 117 to destination host 120, and service requests received from destination host 120 for missing shared memory pages. In some implementations, the source supervisor 113 may include memory page table 115 to store information regarding page migration status. For example, upon migrating a page of memory associated with application 111*a*, source supervisor 113 may modify the corresponding page table entry in memory page table 115 to designate the memory page as not present. In some implementations, the source supervisor 113 can be external to the source host 110, rather than embedded within the source host 110.

In some implementations, source host 110 may additionally include one or more physical central processing units (CPUs) 116 (referred to herein as "processors" or "processing devices") communicatively coupled to memory device 117, and one or more devices 118 (e.g., network interface controller (NICs), graphics cards, etc.). "CPU," "processor," or "processing device" herein shall refer to a device capable of executing instructions encoding arithmetic, logical, or I/O operations. In an illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor, which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). "Memory device" herein shall refer to a volatile or non-volatile memory device, such as random access memory (RAM), read only memory (ROM), electrically erasable programmable read-only memory (EE-PROM), or any other device capable of storing data. "Network interface controller" herein shall refer to a device capable of implementing a physical layer and data link layer standard (such as Ethernet or InfiniBand).

Destination host 120 may include server computers or any other computing devices capable of running one or more destination applications 121*a*. Each destination application 121*a* can be within a respective destination container 121. Each destination application 121*a* can be a software implementation of a containerized application capable of being executed on various physical machines and environments. Each destination application 121*a* may run a guest operating system (OS) that may be different from one virtual machine to another. The guest OS may include Microsoft Windows, Linux, Solaris, Mac OS, etc. In some implementations, the guest OS can itself be a containerized application.

The destination host 120 may additionally include a destination supervisor 123, which provides a virtual operating platform for destination applications 121*a* and manages their execution. In some implementations, the destination supervisor 123 may include memory page table 125 to store information regarding memory pages associated with destination application 121*a* during the migration process. In some implementations, destination host 120 may additionally include one or more physical CPUs 126 (referred to herein as "processors" or "processing devices") communicatively coupled to memory device 127, and one or more devices 128 (e.g., NICs, graphics cards, etc.). In some implementations, the destination supervisor 123 can be external to the destination host 120, rather than embedded within the destination host 120.

In some implementations, the destination supervisor 123 may include migration module 124 that implements fail-safe post-copy migration of applications. Migration module 124 can manage the destination-side tasks for migration of a source application 111*a* to destination application 121*a* in order to ensure that sufficient resources (e.g., a sufficient amount of memory) are present on destination host 120 to support the migration. In response to receiving a request from migration manager 131 to migrate source application 111*a* from source host 110 to destination host 120, migration module 124 can determine the total memory used by source application 111*a* and pre-allocate sufficient memory on destination host 120 to support a successful post-copy live migration of the application. Additionally, migration module 124 can manage device direct-mapping operations for destination application 121*a* once its associated memory has been retrieved from source host 110.

The migration module 124 may store information regarding page migration status in memory page table 125. For example, prior to initiating migration, migration module 124 can pre-allocate memory pages in memory 127 and mark the associated page table entries in memory page table 125 as "not present" for those memory pages. Once migration has been initiated and application 121*a* has been started on host 120, any subsequent request for a memory page that is marked not present can trigger a fault to notify migration module 124 to retrieve the missing memory page from source host 110. Upon receiving a missing memory page from source host 110, migration module 124 may modify the corresponding page table entry in memory page table 125 to designate the memory page as present. Moreover, migration module 124 may use memory page table 125 to store the status of requests submitted to source host 110 for missing memory pages (e.g., to indicate that particular memory pages of shared memory have been requested from the source host, received successfully from the source host, are present in memory 127, etc.).

In response to receiving a request to migrate source application 111a to destination host 120, migration module 124 may begin by determining a total amount of memory (e.g., memory 117) associated with application 111a on source host 110. In some implementations, migration module 124 may make this determination by sending a request to source supervisor 113 for the amount of memory associated with source application 111a. Migration module 124 can then determine whether the available amount of memory on destination host 120 satisfies the total amount of memory associated with application 111a on source host 110. In other words, migration module 124 can determine whether there is a sufficient amount of available memory on destination host 120 to migrate the memory associated with source application 111a.

If the available amount of memory on destination host 120 does not satisfy the total amount of memory associated with application 111a on source host 110, migration module 124 can reject the request to migrate the application to destination host 120. If, however, the available amount of memory on destination host 120 does satisfy the total amount of memory associated with application 111a on source host 110, migration module 124 can proceed with the migration. Migration module 124 can begin by allocating memory pages in memory page table 125 to satisfy the total amount of memory used by application 111a on source host 110. Migration module 124 can pre-allocate these pages in memory 127 with associated page table entries in the memory page table 125 such that they are to be associated with the application once migrated to destination host 120 (e.g., destination application 121a). In some implementations, migration module 124 can complete the pre-allocation for each memory page by marking the pages as "not present" in memory page table 125. By marking the pages as "not present", any subsequent attempt to access the memory pages by application 121a can trigger a fault that causes migration module 124 to retrieve the memory page from the source host 110.

Subsequently, once migration module 124 has determined the memory pages needed to support the migration of application 111a have been pre-allocated, the migration of source application 111a to the destination host 120 (e.g., destination application 121a) can be initiated. In various implementations, migration module 124 can begin the migration by copying the execution state of application 111a from source host 110 to destination host 120 and starting application 121a on destination host 120 using that execution state. Alternatively, migration module 124 can send a notification to source host 110 to begin the copy process. As noted above, each time destination application 121a attempts to access a memory page that is marked as "not present" in memory page table 125, that memory page can be retrieved from source host 110.

Additionally, in some implementations, migration module 124 can manage operations associated with device direct-mapping for destination application 121a in conjunction with its post-copy live migration. As noted above, device direct-mapping can be performed to associated a device 128 (e.g., a NIC, graphics card, etc.) with destination application 121a. In such instances, migration module 124 can initially connect the destination application 121a to device 128 by establishing a virtual device connection between destination application 121a and device 128. The virtual connection can manage communications between destination application 121a and device 128 until each of the memory pages associated with the application have been retrieved from source host 110 and stored on the destination host 120. In some implementations, the virtual connection can be a Virtio connection. Virtio is a virtualization standard for network and disk device drivers where the guest's device driver is aware that it is running in a virtual environment and cooperates with the supervisor, enabling the guest to obtain higher high performance during network and disk operations.

Once migration module 124 has determined that each of the memory pages associated with the migrating application has been retrieved, migration module 124 can pin those memory pages in memory 127. Pinning a memory page can lock the allocated memory page to ensure that page will not be swapped out of memory 127 in favor of a memory page associated with another process. By pinning the memory, migration module 124 can ensure that device direct-mapping can be completed successfully without encountering an out of memory condition that can cause the device assignment to fail. Once the memory has been pinned, migration module 124 can perform the device direct-mapping of device 128 for the destination application 121a. Subsequently, migration module 124 can terminate the virtual device connection. Migration module 124 is described in further detail below with respect to FIGS. 2-3

Figure 2:
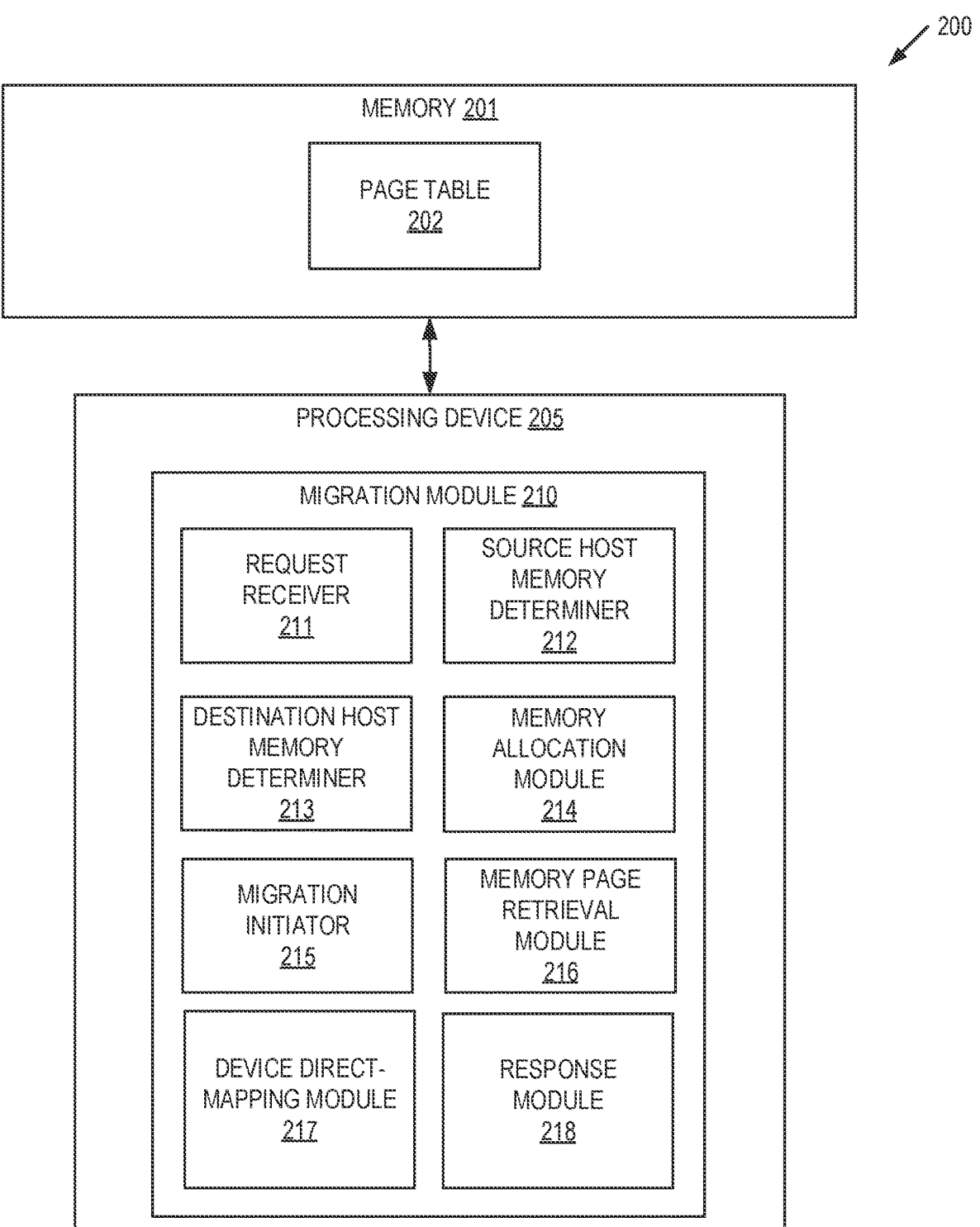
FIG. 2 depicts a block diagram illustrating an example of a migration module to facilitate fail-safe post copy migration of an application in a virtualized computer system, in accordance with one or more aspects of the present disclosure.

FIG. 2 depicts a block diagram illustrating an example of a migration module 210 for facilitating fail-safe post-copy migration of an application in a virtualized computing environment. In some implementations, migration module 210 may correspond to migration module 124 of FIG. 1. As shown in FIG. 2, migration module 210 may be a component of a computing apparatus 200 that includes a processing device 205, operatively coupled to a memory 201, to execute migration module 210. In some implementations, processing device 205 and memory 201 may correspond to processing device 502 and main memory 504 respectively as described below with respect to FIG. 5. In various implementations, migration module 210 may be a component of a supervisor executing on a host that is the destination for a application to be migrated from a source host.

Migration module 210 may include request receiver module 211, source host memory determiner 212, destination host memory determiner 213, memory allocation module 214, migration initiator 215, memory page retrieval module 216, device direct-mapping module 217, and response module 218. Alternatively, the functionality of one or more of request receiver module 211, source host memory determiner 212, destination host memory determiner 213, memory allocation module 214, migration initiator 215, memory page retrieval module 216, device direct-mapping module 217, and response module 218 may be combined into a single module or divided into multiple sub-modules.

Request receiver module 211 is responsible for receiving a request to migrate a application from a source host to a destination host in a virtualized computing environment. As noted above, in some implementations, the request may be received from a host controller that includes a migration manager component. In other implementations, the request may be received from a supervisor executing on the source host. Alternatively, the request may be received from another component of the supervisor executing on the destination host. For example, the destination host supervisor may determine that an application executing on another host should be migrated and send the request to migration module 210, thereby invoking request receiver module 211. Request receiver module can then invoke source host memory determiner 212 and destination host memory determiner 213 to determine the memory needs of the application on the source host and whether those resources are available on the destination host.

Source host memory determiner 212 is responsible for determining a total amount of memory associated with the application on the source host. In some implementations, source host memory determiner 212 can send a request to the source host supervisor for the total amount of memory associated with the application on the source host, and receive the information from the source host supervisor. Alternatively, source host memory determiner 212 can send a request to a migration manager (e.g., migration manager 131 of FIG. 1) that executes on a separate host controller. In other implementations, the amount of memory used by the application can be sent with the migration request to request receiver module 211, which can then be passed to source memory determiner 212 is invoked. In various implementations, the total amount of memory associated with the application on the source host can be the total amount of memory used by the application on the source host. Alternatively, the total amount of memory can be the total amount of memory allocated to the application according to that application's initial configuration.

Destination host memory determiner 213 is responsible for determining whether the amount of memory used on the source host by the application to be migrated can be satisfied by the resources available on the destination host. Destination host memory determiner 213 can first assess the amount of memory available on the destination host. Destination host memory determiner 213 can then compare the amount of memory used by the application on the source host to the amount of memory available on the destination host to determine whether the available memory on the destination host satisfies the memory used on the source host.

Responsive to determining that the available amount of memory on the destination host does not satisfy the total amount of memory associated with the application on the source host, destination host memory determiner 213 can invoke response module 218 to reject the migration request. In such instances, the application may not be migrated to the destination host and can continue execution on the source host until such time that memory becomes available on the destination host, or an alternative destination host is selected for the migration. Responsive to determining that the available amount of memory on the destination host does satisfy the total amount of memory associated with the application on the source host, destination host memory determiner 213 can invoke memory allocation module 214 and migration initiator 215 to proceed with the application migration.

Memory allocation module 214 is responsible for allocating one or more memory pages in a page table on the destination host to satisfy the total amount of memory associated with the application on the source host. In various implementations, memory allocation module 214 can pre-allocate memory pages in memory 201 with associated page table entries in page table 202 to reserve the memory resources needed by the migrating application. Memory allocation module 214 can allocate the number of memory pages in view of the information received by request receiver 211 and/or the determinations made by source host memory determiner 212 and destination host memory determiner 213. As noted above, memory allocation module 214 can additionally mark each of the page table entries for the pre-allocated memory pages to indicate that the memory pages are "not present". If the application begins execution on the destination host and attempts to access a page of its associated memory that is marked "not present", a fault can be triggered to indicate to migration module 210 (or another component of the destination host hypervisor) that the memory page still resides on the source host. In such instances, memory page retrieval module 216 can be invoked to retrieve the page as described below.

Memory allocation module 214 can continue the allocation process until determining that the number of memory pages pre-allocated in page table 202 is sufficient to satisfy the total amount of memory associated with the application on the source host. Memory allocation module 214 can make this determination by comparing the number of pages allocated in page table 202 to the number of pages used by the application on the source, comparing the total amount of memory allocated in page 202 to the total amount of memory associated with the application on the source host, or in any other similar manner. Responsive to determining that the memory pages have been allocated on the destination host, migration initiator 215 can be invoked to initiate migration of the application from the source host to the destination host. In various implementations, if memory allocation module 214 in unable to allocate a sufficient number of memory pages to satisfy the total amount of memory associated with the application on the source host (e.g., if sufficient resources are no longer available), memory allocation module can abort the allocation process, return any pre-allocated memory to the system for allocation to another process, and invoke response module 218 to reject the migration request.

Migration initiator 215 is responsible for initiating migration of the application from the source host to the destination host. In some implementations, migration initiator 215 can begin the migration process by copying the execution state of the application from the source host to the destination host. For example, migration initiator 215 can send a request to the applicable source host to initiate the copy process. The source host can send the state information to migration initiator 215, which can subsequently store the state information in memory 201. Once the appropriate execution state information has been received and stored, migration initiator 215 can start the application on the destination host. Migration initiator 215 can send a notification to the source host (or to a host controller that executes a migration manager which can relay the notification to the source host) to cause the source host to terminate execution of the application on the source host.

Memory page retrieval module 216 is responsible for retrieving memory pages from the source host for the application once it has been started on the destination host. As noted above, the pre-allocated memory that has not yet been retrieved from the source host is marked as "not present" in page table 202. When the migrated application attempts to access any memory page that is marked as "not present", a fault can be generated that causes the destination hypervisor to invoke memory page retrieval module 216 to retrieve that memory page. In such instances, memory page retrieval module 216 can pause the execution of the application on the destination host, and send a request to the source host to retrieve the memory page from the source host. Once the memory page has been received from the source host, memory page retrieval module can store that memory page in memory 201 of the destination host and mark the associated page table entry for the retrieved memory page as "present" in page table 202. Memory page retrieval module 216 can then resume execution of the application on the destination host.

In some implementations, the application being migrated may utilize device assignment on the source host to communicate with a physical device (e.g., a NIC, a graphics card, etc.). In such instances, the migrating application can be initially configured on the destination host without device direct-mapping until the pre-allocated memory pages have been retrieved from the source host. Migration initiator 215 can invoke another component of migration module 210 to first configure a virtual device connection (e.g., a Virtio connection) between the migrated application on the destination host with the appropriate physical device the memory pages of the migrated application have been retrieved from the source host.

Subsequently, as each memory page associated with the migrating application has been retrieved and copied to memory 201 of the destination host, memory page retrieval module 216 can determine whether device direct-mapping is to be implemented for the migrated application. Memory page retrieval module 216 can make this determination by accessing configuration data associated with the migrating application. In some implementations, the configuration data may be received in the initial request to migrate the application. Alternatively, the configuration data may be obtained by sending a request to the source host, sending a request to a migration manager executing on a separate controller, or the like. If memory page retrieval module 216 determines that device direct-mapping is to be implemented, each retrieved memory page can be pinned to memory 201 to prevent the memory pages from being swapped out prior to completing device direct-mapping for the device. In various implementations, the memory page may be pinned by increasing a reference count for the memory page table entry associated with the memory page, by executing a pinning or locking function (e.g., executing an "mlock( )" function), or the like.

Responsive to determining that each of the memory pages associated with the application has been retrieved from the source host, device direct-mapping module 217 can be invoked. Device direct-mapping module 217 is responsible for managing direct mapping of a physical device (e.g., NICs, graphics cards, etc.) associated with the migrating application. In some implementations, device direct-mapping module 217 can map the memory associated with the migrated application to the applicable device so that the device can perform direct memory access (DMA) operations on the memory space of the application. Once the device direct-mapping process has been completed, granting the device access to the applicable memory pages of the migrated application, device assignment module 217 can terminate the virtual device connection (e.g., the Virtio connection) between the application to the physical device.

Response module 218 is responsible for conducting communications between the destination host and the source host and/or a migration manager executing on a separate controller. As noted above, response module 218 can send notifications that reject migration requests, send requests for configuration data associated with a migrating application, send requests to obtain the total amount of memory associated with an application on a source host that is to be migrated, or the like. Response module 218 can additionally send notifications to the source host and/or migration manager to indicate that an application has been successfully started on the destination host.

Figure 3:
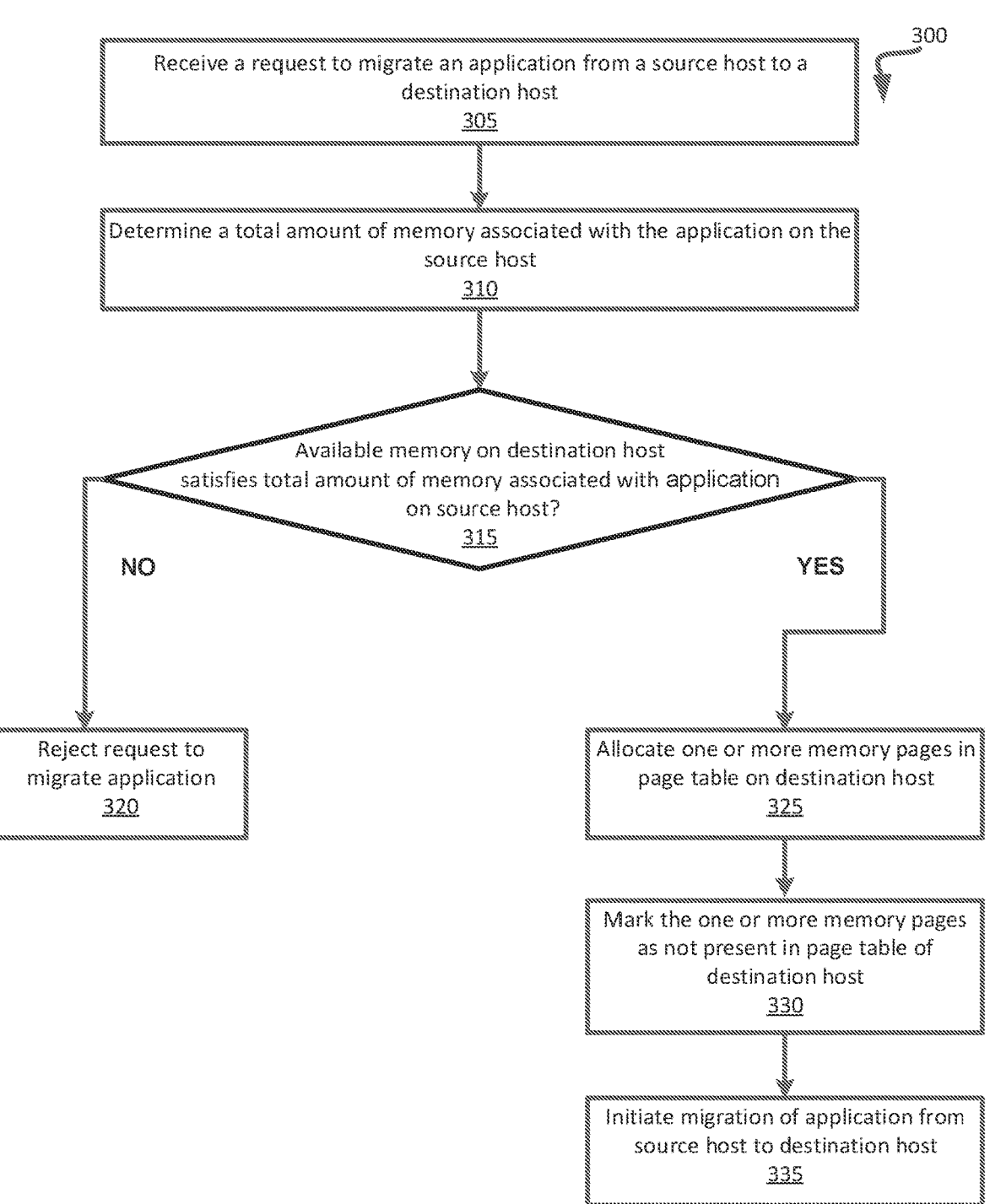
FIG. 3 depicts a flow diagram of a method for facilitating fail-safe post copy migration of an application in a virtualized computer system, in accordance with one or more aspects of the present disclosure.

FIG. 3 depicts a flow diagram of an example method 300 for fail-safe post copy migration of an application in a virtualized computer system. The method may be performed by processing logic that may comprise hardware (circuitry, dedicated logic, etc.), computer readable instructions (run on a general purpose computer system or a dedicated machine), or a combination of both. In an illustrative example, method 300 may be performed by migration module 124 in FIG. 1, or migration module 210 in FIG. 2. Alternatively, some or all of method 300 might be performed by another module or machine. It should be noted that blocks depicted in FIG. 3 could be performed simultaneously or in a different order than that depicted.

At block 305, processing logic receives a request to migrate an application from a source host to a destination host. At block 310, processing logic determines a total amount of memory associated with the application on the source host. At block 315, processing logic determines whether an available amount of memory on the destination host satisfies the total amount of memory associated with the application on the source host. If not, processing proceeds to block 320 where processing logic rejects the request to migrate the application. Otherwise, processing continues to block 325.

At block 325, processing logic allocates one or more memory pages in a page table on the destination host to satisfy the total amount of memory associated with the application on the source host, where the one or more memory pages are to be associated with the application on the destination host. At block 330, processing logic marks the one or more memory pages as not present in the page table of the destination host. At block 335, processing logic initiates migration of the application from the source host to the destination host. In some implementations, processing logic may initiate the migration responsive to determining that all of the memory pages to satisfy the total amount of memory associated with the application on the source host have been allocated on the destination host. In some embodiments, migration can refer to restoring the application from the source host on the destination host.

Figure 4:
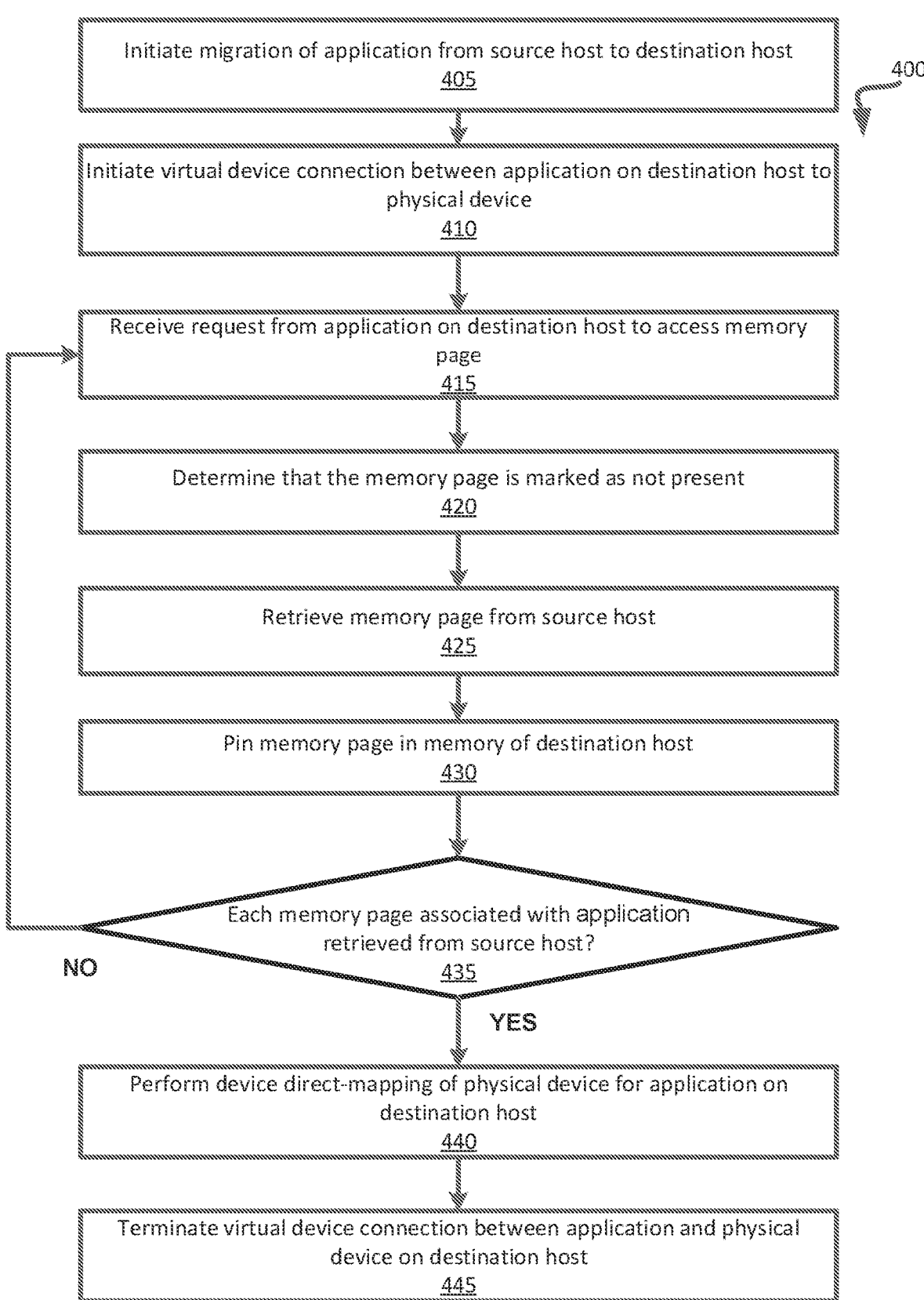
FIG. 4 depicts a flow diagram of a method for fail-safe device direct-mapping for post copy migration of an application in a virtualized environment, in accordance with one or more aspects of the present disclosure.

FIG. 4 depicts a flow diagram of an example method 400 for fail-safe device direct-mapping for post copy migration of an application in a virtualized environment. The method may be performed by processing logic that may comprise hardware (circuitry, dedicated logic, etc.), computer readable instructions (run on a general purpose computer system or a dedicated machine), or a combination of both. In an illustrative example, method 400 may be performed by migration module 124 in FIG. 1, or migration module 210 in FIG. 2. Alternatively, some or all of method 400 might be performed by another module or machine. It should be noted that blocks depicted in FIG. 4 could be performed simultaneously or in a different order than that depicted.

At block 405, processing logic initiates migration of an application from a source host to a destination host. In some embodiments, migration can refer to restoring the application from the source host on the destination host.

At block 410, processing logic initiates a virtual device connection between the application on the destination host to a physical device associated with the destination host. At block 415, processing logic receives a request from an application on a destination host to access a memory page. At block 420, processing logic determines that the memory page is marked as not present in a page table of the destination host. At block 425, processing logic retrieves the memory page from the source host. At block 430, processing logic pins the memory page in the memory space of the destination host.

At block 435, processing logic determines whether each of the memory pages associated with the application has been retrieved from the source host. If not, processing returns to block 415 to continue to monitor the memory pages of the application on the destination host. Otherwise, processing proceeds to block 440. At block 440, processing logic performs device direct-mapping of the physical device for the application on the destination host. At block 445, processing logic terminates the virtual device connection between the application and the physical device on the destination host.

Figure 5:
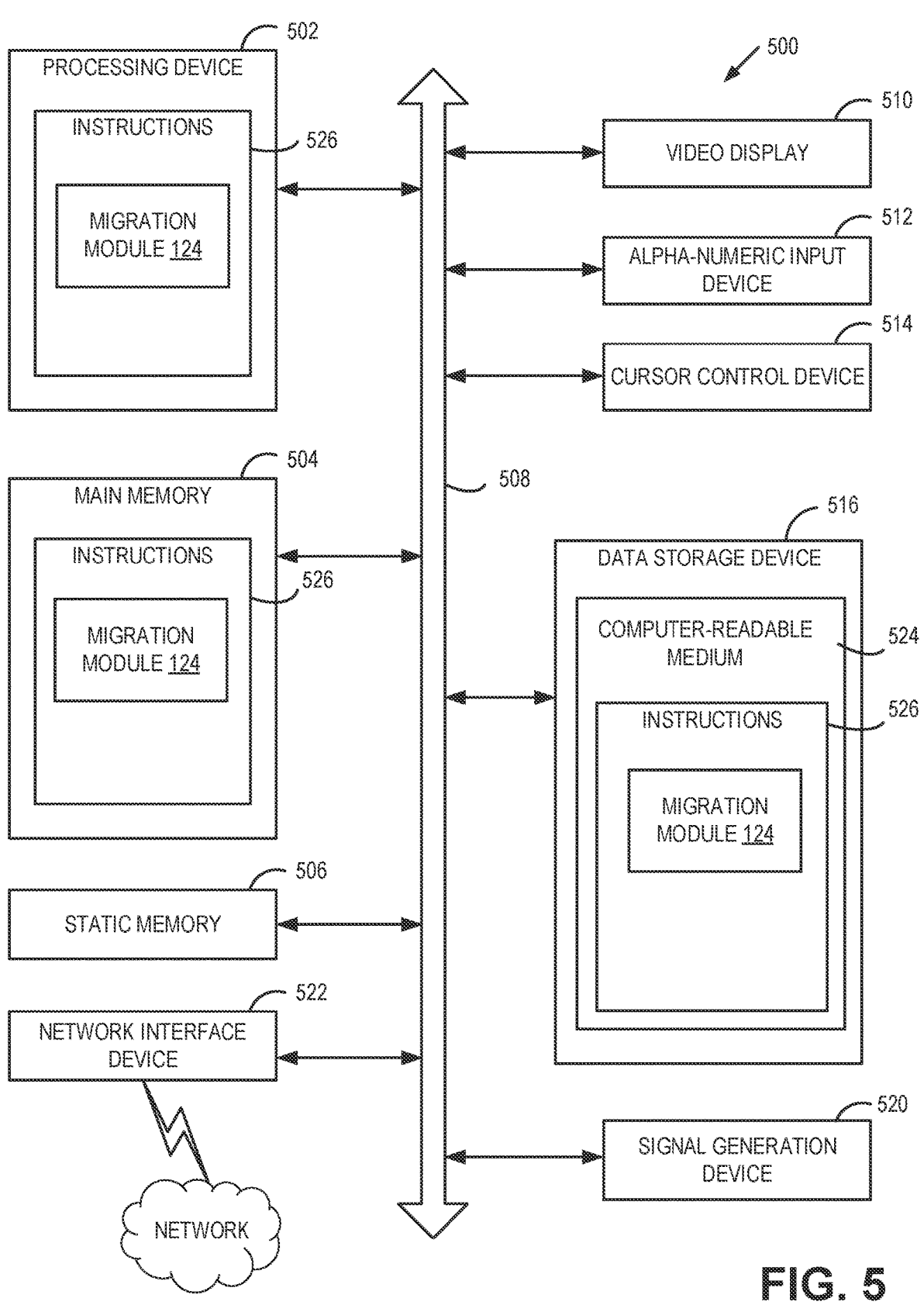
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The computer system 500 may be included within a data center that supports virtualization. Virtualization within a data center results in a physical system being virtualized using VMs and/or containerized applications to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources. A containerized application may be a software-based emulation of operating system and application resources. For example, the containerized application may operate in a container that packages together all the code, its dependencies, operating system needed to run the application. Containers thereby utilize a form of OS virtualization that take advantage of the host operating system to isolate particular processes and control the processes' access to processing and memory resources.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes migration module 124 for performing the operations and steps discussed herein (e.g., corresponding to the method of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include migration module 124 (e.g., corresponding to the method of FIGS. 3-4, etc.) embodying any one or more of the methodologies or functions described herein. Migration module 124 may also reside, completely or at least partially, within the main memory 504 and/or within the processing device 502 during execution thereof by the computer system 500, the main memory 504 and the processing device 502 also constituting computer-readable media. Migration module 124 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "allocating," "initiating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:

receiving, by a processing device executing a supervisor on a destination host, a request to migrate an application from a source host to the destination host;

prior to initiating migration of the application, determining a total amount of memory associated with the application on the source host, wherein the total amount of memory comprises a total amount of memory allocated to the application according to an initial configuration of the application, and wherein the initial configuration of the application differs from a current configuration of the application;

determining whether an available amount of memory on the destination host satisfies the total amount of memory associated with the application on the source host; and responsive to determining that the available amount of memory on the destination host satisfies the total amount of memory associated with the application on the source host:

allocating, by the processing device, one or more memory pages in a page table on the destination host to satisfy the total amount of memory associated with the application on the source host, wherein the one or more memory pages are to be associated with the application on the destination host; and responsive to determining that the one or more memory pages have been allocated on the destination host, initiating migration of the application from the source host to the destination host.

2. The method of claim 1, further comprising:

responsive to determining that the available amount of memory on the destination host does not satisfy the total amount of memory associated with the application on the source host, rejecting the request to migrate the application to the destination host.

3. The method of claim 1, wherein allocating the one or more memory pages further comprises:

marking the one or more memory pages as not present in the page table of the destination host.

4. The method of claim 1, wherein initiating the migration of the application further comprises:

copying an execution state of the application from the source host to the destination host; and starting the application on the destination host.

5. The method of claim 1, further comprising:

receiving a request from the application on the destination host to access a memory page of the one or more memory pages;

determining whether the memory page of the one or more memory pages is marked as not present in the page table of the destination host; and responsive to determining that the memory page of the one or more memory pages is marked as not present in the page table of the destination host:

pausing execution of the application on the destination host;

retrieving the memory page from the source host;

storing the memory page on the destination host;

marking the memory page as present in the page table on the destination host; and resuming execution of the application on the destination host.

6. The method of claim 1, further comprising:

initiating a virtual device connection between the application on the destination host to a physical device.

7. The method of claim 6, further comprising:

responsive to determining that each of the one or more memory pages associated with the application has been retrieved from the source host:

performing a direct mapping of the physical device for the application on the destination host; and terminating the virtual device connection between the application on the destination host to the physical device.

8. A system comprising:

a memory; and a processing device, operatively coupled to the memory, to execute a supervisor on a destination host to:

receive a request to migrate an application from a source host to the destination host;

prior to initiating migration of the application, determine a total amount of memory associated with the application on the source host, wherein the total amount of memory comprises a total amount of memory allocated to the application according to an initial configuration of the application, and wherein the initial configuration of the application differs from a current configuration of the application;

determine whether an available amount of memory on the destination host satisfies the total amount of memory associated with the application on the source host;

responsive to determining that the available amount of memory on the destination host satisfies the total amount of memory associated with the application on the source host, allocate one or more memory pages in a page table on the destination host to satisfy the total amount of memory associated with the application on the source host, wherein the one or more memory pages are to be associated with the application on the destination host; and responsive to determining that the one or more memory pages have been allocated on the destination host, initiate migration of the application from the source host to the destination host.

9. The system of claim 8, wherein to allocate the one or more memory pages, the processing device is further to:

determine whether an available amount of memory on the destination host satisfies the total amount of memory associated with the application on the source host; and allocate the one or more memory pages responsive to determining that the available amount of memory on the destination host satisfies the total amount of memory associated with the application on the source host.

10. The system of claim 9, wherein the processing device is further to:

responsive to determining that the available amount of memory on the destination host does not satisfy the total amount of memory associated with the application on the source host, reject the request to migrate the application to the destination host.

11. The system of claim 8, wherein to allocate the one or more memory pages, the processing device is further to:

mark the one or more memory pages as not present in the page table of the destination host.

12. The system of claim 8, wherein to initiate the migration of the application, the processing device is further to:

copy an execution state of the application from the source host to the destination host; and start the application on the destination host.

13. The system of claim 8, wherein the processing device is further to:

receive a request from the application on the destination host to access a memory page of the one or more memory pages;

determine whether the memory page of the one or more memory pages is marked as not present in the page table of the destination host; and responsive to determining that the memory page of the one or more memory pages is marked as not present in the page table of the destination host:

pause execution of the application on the destination host;

retrieve the memory page from the source host;

store the memory page on the destination host;

mark the memory page as present in the page table on the destination host; and resume execution of the application on the destination host.

14. The system of claim 8, wherein the processing device is further to:

initiate a virtual device connection between the application on the destination host to a physical device.

15. The system of claim 14, wherein the processing device is further to:

responsive to determining that each of the one or more memory pages associated with the application has been retrieved from the source host:

perform a direct mapping of the physical device for the application on the destination host; and terminate the virtual device connection between the application on the destination host to the physical device.

16. A non-transitory computer readable medium comprising instructions, which when accessed by a processing device, cause the processing device to:

receive, by a supervisor on a destination host, a request to migrate an application from a source host to the destination host;

prior to initiating migration of the application, determine a total amount of memory associated with the application on the source host, wherein the total amount of memory comprises a total amount of memory allocated to the application according to an initial configuration of the application, and wherein the initial configuration of the application differs from a current configuration of the application;

determine whether an available amount of memory on the destination host satisfies the total amount of memory associated with the application on the source host; and responsive to determining that the available amount of memory on the destination host satisfies the total amount of memory associated with the application on the source host:

allocate one or more memory pages in a page table on the destination host to satisfy the total amount of memory associated with the application on the source host, wherein the one or more memory pages are to be associated with the application on the destination host;

mark the one or more memory pages as not present in the page table of the destination host; and responsive to determining that the one or more memory pages have been allocated on the destination host, initiate migration of the application from the source host to the destination host.

17. The non-transitory computer readable medium of claim 16, wherein the instructions further cause the processing device to:

responsive to determining that the available amount of memory on the destination host does not satisfy the total amount of memory associated with the application on the source host, reject the request to migrate the application to the destination host.

18. The non-transitory computer readable medium of claim 16, wherein the instructions further cause the processing device to:

receive a request from the application on the destination host to access a memory page of the one or more memory pages;

determine whether the memory page of the one or more memory pages is marked as not present in the page table of the destination host; and responsive to determining that the memory page of the one or more memory pages is marked as not present in the page table of the destination host:

pause execution of the application on the destination host;

retrieve the memory page from the source host;

store the memory page on the destination host;

mark the memory page as present in the page table on the destination host; and resume execution of the application on the destination host.

19. The non-transitory computer readable medium of claim 16, wherein the instructions further cause the processing device to:

initiate a virtual device connection between the application on the destination host to a physical device.

20. The non-transitory computer readable medium of claim 19, wherein the instructions further cause the processing device to:

responsive to determining that each of the one or more memory pages associated with the application has been retrieved from the source host:

perform a direct mapping of the physical device for the application on the destination host; and terminate the virtual device connection between the application on the destination host to the physical device.

* * * * *